United States Patent [19]

Ammann

[11] 4,048,516

[45] Sept. 13, 1977

[54] LASER APPARATUS FOR PRODUCING STIMULATED RAMAN SCATTERING

[75] Inventor: Eugene O. Ammann, Los Altos, Calif.

[73] Assignee: GTE Sylvania Incorporated, Mountain View, Calif.

[21] Appl. No.: 746,670

[22] Filed: Dec. 2, 1976

[51] Int. Cl.² ............................................. H03F 7/00
[52] U.S. Cl. .............................. 307/88.3; 331/107 R; 363/157
[58] Field of Search ................... 307/88.3; 331/107 R; 321/69 R

[56] References Cited

PUBLICATIONS

Ammann et al., "Applied Physics Letters", Dec. 15, 1975, pp. 662–664.

*Primary Examiner*—Rudolph V. Rolinec
*Assistant Examiner*—Darwin R. Hostetter
*Attorney, Agent, or Firm*—John F. Lawler

[57] ABSTRACT

Stimulated Raman scattering (SRS) at kHz pulse repetition rates is substantially improved with a laser configuration in which the Raman oscillator mirrors within the laser resonator are removed and the laser mirrors are used for both the laser and the Raman (Stokes) resonators. This sharing of the laser resonator by the Raman oscillator has increased the average power and stability of the first and second Stokes wavelengths, has reduced optical wear on the mirrors, and has resulted in a substantially simplified resonator design.

4 Claims, 4 Drawing Figures

LASER APPARATUS FOR PRODUCING STIMULATED RAMAN SCATTERING

BACKGROUND OF THE INVENTION

This invention relates to an improved Raman oscillator capable of producing stimulated Raman scattering (SRS) at high pulse repetition frequencies.

Light scattering spectroscopy of various substances is well known and involves the scattering of a light beam which traverses a transparent dielectric sample (solid, liquid or gas), the scattering being caused by the different dielectric characteristics of the sample. This linear or thermal scattering of light has been observed without lasers for a long time. With the advent of the laser and its high intensity, collimation, and monochromaticity, research in light scattering spectroscopy has been greatly facilitated.

SRS concerns scattering from the optic vibrational modes and is achieved by directing a pump beam from a laser, usually pulsed, through a Raman medium such as crystal. The pump beam decomposes into a Stokes wavelength output, which is photon-like, and a Raman wavelength output. The Raman output is closely tied to a natural vibrational mode of the crystal and can be either purely phonon-like, or partially phonon-like and photon-like in character.

In the decomposition process, conservation of energy must be satisfied as stated in the frequency equation $$f_P = f_S + f_R \qquad (1)$$

where $f_P$, $f_S$ and $f_R$ are the pump, Stokes and Raman frequencies, respectively, and conservation of momentum must be satisfied as stated in the wavevector equation $$\vec{k}_P = \vec{k}_S + \vec{k}_R \qquad (2)$$

where $k$ is the wavevector for each of these waves. Since SRS results in the generation of both Stokes and Raman waves, the resonator or oscillator which produces these waves is known as either a Raman or a Stokes resonator or oscillator.

Stokes outputs represent coherent optical outputs at new wavelengths that may not be available directly from existing lasers. The Stokes output can have several different components at successively longer wavelengths known as the first Stokes, second Stokes, third Stokes, etc. The first Stokes output is generated as per Equations (1) and (2) above. In certain circumstances, this newly generated first Stokes beam can itself act as a pump for SRS thereby producing a so-called second Stokes output. If the second Stokes beam in turn acts as the pump for still further SRS, a third Stokes beam is generated, and so forth.

A Raman oscillator configuration that has been successfully tested is described in an article by E. O. Ammann and J. Falk in Applied Physics Letters, Vol. 27, No. 12, Dec. 15, 1975, pages 662-664, entitled "Stimulated Raman Scattering at kHz Pulse Repetition Rates" and comprises a separate Raman resonator within the laser cavity. This invention is directed toward an improvement to that Raman oscillator.

OBJECTS AND SUMMARY OF THE INVENTION

An object of the invention is the provision of laser apparatus with a simplified Raman oscillator configuration and having improved performance as compared to prior oscillators.

Another object is the provision of laser apparatus for SRS in which both the power and stability of the Stokes output wave are improved.

Still another object is the provision of laser apparatus for SRS in which damage to optical components is reduced.

These and other objects of the invention are achieved with a laser configuration for achieving SRS in which the Raman oscillator and the pump laser share the same resonator mirrors. The Raman oscillator output circulates through the entire laser cavity so that the laser mirrors reflect both the laser pump and Stokes outputs. While the increased length of the Raman resonator in the shared resonator configuration has the disadvantage of smaller filling factor (the ratio of Raman crystal length to Raman resonator length) for the Raman oscillator, this is more than offset by advantages gained through more efficient coupling of pump and Stokes modes.

DESCRIPTION OF PREFERRED EMBODIMENTS

Figure 1:
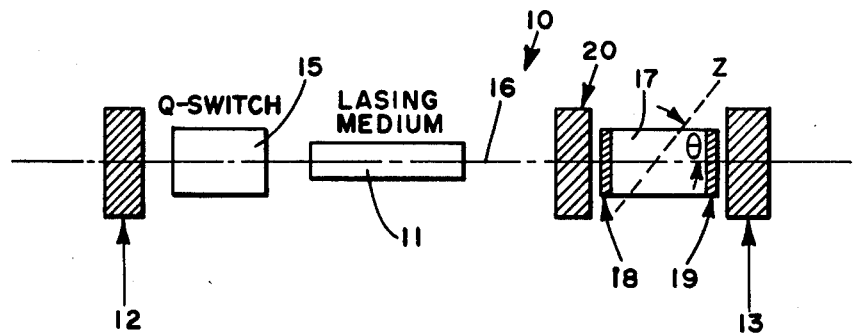
FIG. 1 is a block diagram showing a prior art laser configuration for producing SRS.

Referring now to the drawings, FIG. 1 illustrates prior art laser apparatus 10 comprising a lasing medium 11 such as neodymium yttrium aluminate (Nd:YAlO₃) in a cavity defined by laser mirrors 12 and 13. The medium 11 is continuously pumped by a light source, not shown, which may consist of krypton-arc lamps, and is repetitively Q-switched by Q-switch 15 disposed in the laser cavity between medium 11 and mirror 12 for generating high intensity pulses of light along the optical axis 16 of the laser. Also disposed within the laser cavity is a Raman medium 17 which may be a lithium iodate (LiIO₃) crystal having its x-axis in a plane perpendicular to the plane of the drawing and a z-axis disposed at an angle $\theta$ to the pump light propagation direction. The faces 18 and 19 of crystal 17 that extend transversely of axis 16 have anti-reflecting coatings centered at the laser pump wavelength so that the pump and Stokes waves traverse the crystal substantially without reflection.

A mirror 20 is disposed adjacent to inner face 18 of crystal 17 and together with mirror 13 forms the resonator for the Raman (Stokes) oscillator. Mirror 20 is highly reflective at the first and second Stokes wavelengths and is highly transmissive at the laser wavelength. Mirrors 12 and 13 are highly reflective at the laser wavelength; mirror 13 is partially transmissive at the first Stokes wavelength and is highly transmissive at the second Stokes wavelength, while mirror 12 is highly reflective at the first Stokes wavelength and highly transmissive at the second Stokes wavelength. With such selection of mirror reflectivities and transmittances, generation of a first Stokes output is achieved while the second Stokes output is suppressed. Conversely, if a second Stokes output is desired, mirror reflectivities will be chosen to promote but not couple out the first Stokes output while promoting and coupling out the second Stokes output. Thus, in the foregoing example of first Stokes generation when the Q-switch laser is operated, the laser beam is reflected between mirrors 12 and 13, pumps crystal 17 and through SRS produces a first Stokes wave that oscillates between mirrors 13 and 20 while the second Stokes wave is suppressed. The first Stokes output is taken through partially transmissive mirror 13. By way of example, a lasing medium 11 of Nd:YAlO$_3$ and a crystal 17 of LiIO$_3$ produce a pump beam at 1.08 $\mu$m and first and second Stokes outputs at 1.18 $\mu$m and 1.31 $\mu$m, respectively.

Figure 2:
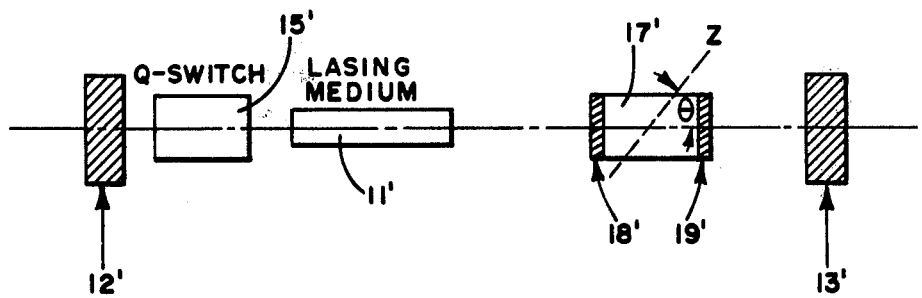
FIG. 2 is a block diagram showing a laser configuration embodying this invention.

In accordance with this invention, SRS is achieved with a two-mirror laser embodiment shown in FIG. 2, like parts being indicated by the primes of like reference characters in the drawings. Mirrors 12' and 13' define both the laser resonator and the Raman resonator so that the first and second Stokes modes are reflected between mirrors 12' and 13' as is the output of the laser pump itself. The average power in the first and second Stokes modes, however, is slightly greater than those corresponding modes in the three-mirror configuration of FIG. 1. In addition, the Stokes output power has increased stability and the Stokes pulses are longer than in the three-mirror embodiment. The longer Stokes pulses in general are less likely to damage the components of the Raman oscillator than the shorter pulses because of their generally lower peak intensities. Furthermore, the shared resonator configuration with fewer parts is a more simplified construction and is easier to align preparatory to operation of the system.

One of the reasons for the improved operation of the shared resonator configuration of FIG. 2 introducing strong Raman oscillation will be better understood with the following explanation. As mentioned above in Equation (1), in the basic Raman process, $$f_P = f_S + f_R.$$

Since both the pump and Stokes beams are resonated in the two-mirror and three-mirror configurations of FIGS. 1 and 2, respectively, different longitudinal modes can exist having a $c/2l$ spacing, where $l$ is the cavity length for the beam in question. Since the Raman beam is a highly damped optical phonon and is not resonated, it does not consist of different longitudinal modes. If the various longitudinal modes of the pump and Stokes beams are to participate in the SRS, each must satisfy Equation (1).

Figure 3:
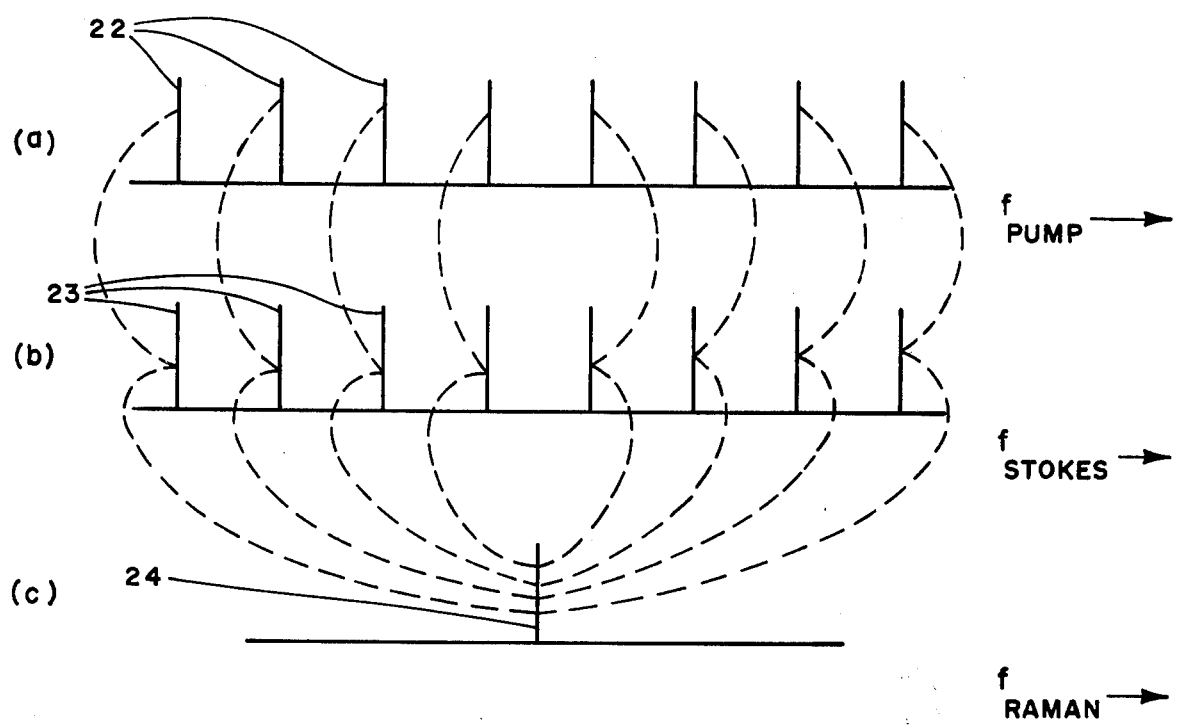
FIG. 3 is a diagram showing the interaction of the pump, Stokes and Raman modes in the laser configuration of FIG. 2.

Referring now to the longitudinal modes depicted in FIG. 3 for the two-mirror Raman configuration of FIG. 2, FIG. 3a illustrates the longitudinal modes 22 for the pump while FIG. 3b shows the longitudinal modes 23 for the first Stokes beam. The modes that interact together to produce SRS are connected by dashed lines. An important aspect is that since the pump and Stokes beams share the same resonator, their longitudinal mode spacings are identical. This means that all pump modes and all Stokes modes are coupled to the same Raman mode 24. Thus the pump modes, in effect, act in unison to reach threshold rather than acting individually as is the case in the three-mirror configuration.

Figure 4:
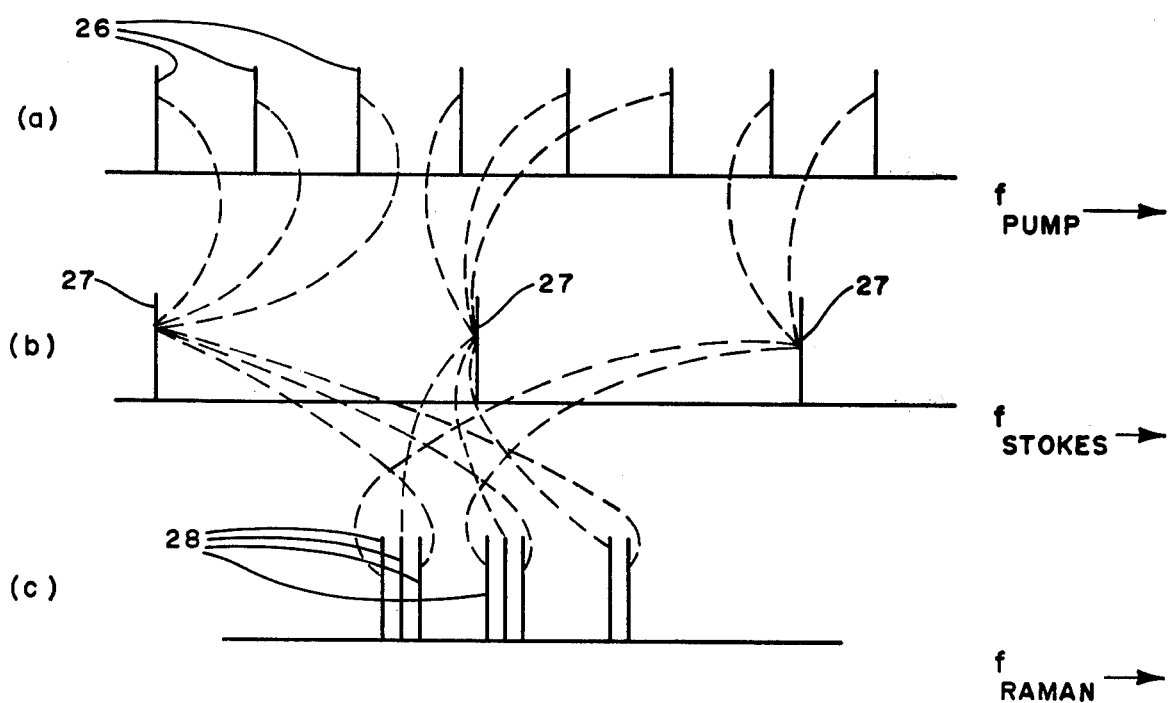
FIG. 4 is a diagram similar to FIG. 3 for the prior art configuration of FIG. 1.

In order to further illustrate this principle of operation, consider the corresponding situation for the three-mirror Raman configuration of FIG. 1. The laser resonator is formed by mirrors 12 and 13 while the Stokes resonator is formed by mirrors 20 and 13. These two resonators have different lengths; the longitudinal mode spacings for the pump and Stokes beams are therefore different as shown in FIG. 4. In this case each pump longitudinal mode 26 requires a separate Raman vibrational mode 28 in order to satisfy Equation (1). Separate Raman vibrational modes and separate Stokes modes 27 must build up in order to accommodate the various longitudinal pump modes for the three-mirror Raman configuration. While there is some sharing of the common Stokes modes in FIG. 4, the sharing is much less complete than the Raman mode sharing illustrated in FIG. 3.

What is claimed is:

1. Apparatus for producing stimulated Raman scattering comprising
    a laser having
        a lasing medium,
        means to excite said lasing medium whereby to produce a beam of coherent light, and
        laser mirrors spaced from opposite sides respectively of said medium and traversing said beam whereby to define the laser cavity,
    switch means in said laser cavity operative on said beam,
    means to activate and deactivate said switch means whereby to produce a succession of pulses of said coherent light,
    a body of transparent dielectric material between said lasing medium and one of said mirrors and positioned to be traversed by said light pulses whereby to produce stimulated Raman scattering of the light, and
    means to cause said scattered light to oscillate through said dielectric material comprising said laser mirrors.

2. The apparatus according to claim 1 in which said dielectric material is lithium iodate (LIO$_3$).

3. The apparatus according to claim 1 in which said switch means is a Q-switch.

4. Apparatus for producing stimulated Raman scattering comprising
    a laser having cavity defined by a pair of mirrors and producing a laser beam,
    Q-switch means operative on said beam to produce high intensity pulses, and
    crystal means positioned in said cavity to be traversed by said pulses whereby to stimulate Raman scattering and produce an output at the Stokes wavelengths, and
    means to resonate said Stokes outputs comprising the laser mirrors.

* * * * *